June 25, 1935.  C. B. SCHAFER  2,006,183
TEMPLATE
Filed Nov. 13, 1930
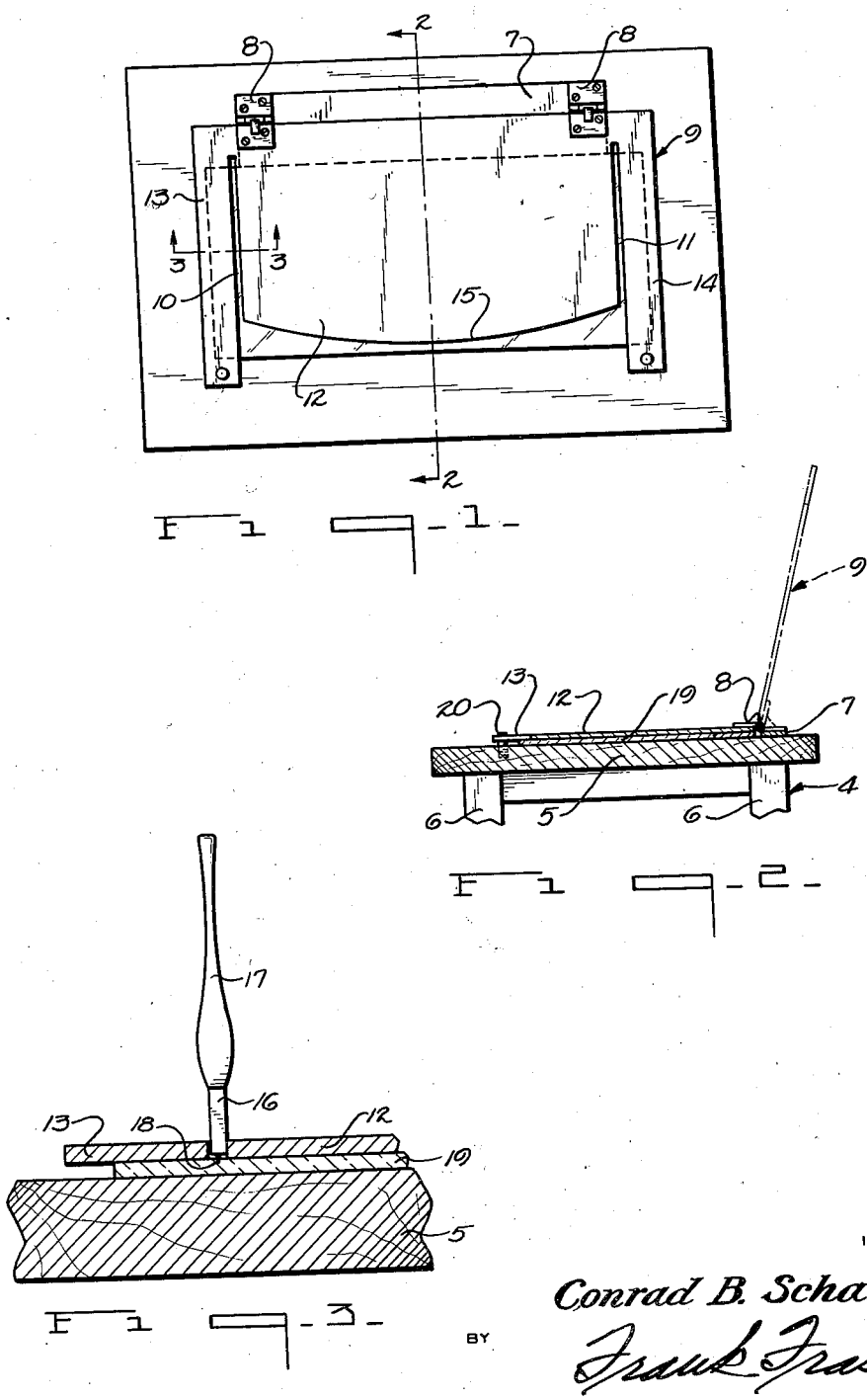
INVENTOR
Conrad B. Schafer
BY Frank Fraser
ATTORNEY Patented June 25, 1935

2,006,183

UNITED STATES PATENT OFFICE 2,006,183

TEMPLATE

Conrad B. Schafer, Toledo, Ohio, assignor to Libbey-Owens-Ford Glass Company, Toledo, Ohio, a corporation of Ohio Application November 13, 1930, Serial No. 495,364

2 Claims. (Cl. 33—76)

The present invention relates to apparatus for use in the cutting of glass sheets or plates or other sheet material, and more particularly to the provision of an improved form of template. In the cutting of glass sheets or plates and especially in the cutting of glass for use in automobile windshields, windows, and the like, an exceptionally accurate cut is desirable, since in the event the sheet is oversize, it requires too much grinding to remove the excess material, while on the other hand, too small a sheet is wasted. Ordinarily, the cutting of glass sheets for this purpose is effected by first placing a template of the desired shape and size upon the glass sheet to be cut, after which a scoring tool is drawn over and in contact with the glass, being held in engagement with the outer edges of the template and guided thereby. After scoring, the template is removed and the glass broken along the score lines. The cutting tool ordinarily used is of the hand operated type having a diamond or a rotatable steel cutting wheel. With such a type of cutter, however, if the cutter is not held absolutely straight or perpendicular with respect to the glass sheet, the said sheet will be cut either slightly larger or slightly smaller than desired. As pointed out above, in the event the sheet is oversize, it must be ground down, whereas on the other hand, if the sheet is cut too small, it is entirely wasted. This grinding and waste can be avoided by the obtaining of a close accurate cut.

The aim and principal object of the present invention is the provision of means for facilitating and expediting the cutting of glass sheets or plates by the use of which an accurate cutting thereof to the desired shape and size may be assured and wherein the accuracy of the cut will not be dependnt wholly upon the skill of the operator.

Another object of the invention is the provision of means of the above character consisting of a novel form of template constructed to positively maintain the scoring tool straight or perpendicular with respect to the glass sheet at all times during the cutting operation so that the said sheet can be rapidly and efficiently cut to the desired predetermined size and shape, thereby avoiding grinding of the sheet which would be necessitated if the sheet were oversize and likewise avoiding waste incident to the cutting of the sheet too small.

Other objects and advantages of the invention will become more apparent during the course of the following description when taken in connection with the accompanying drawing.

In the drawing wherein like numerals are employed to designate like parts throughout the same, Fig. 1 is a top plan view of apparatus provided by the present invention, Fig. 2 is a section taken substantially on line 2—2 of Fig. 1, and Fig. 3 is a section taken substantially on line 3—3 of Fig. 1.

Referring now to the drawing, 4 designates in its entirety a table or the like for supporting the glass sheet to be cut, said table being provided with a flat horizontal top 5 upon which the glass sheet is adapted to be placed, said top being supported by vertical legs 6. Secured to the top of the table and extending longitudinally thereof adjacent its rear edge is a strip 7 to which is connected, by means of hinges 8, the improved template member provided by the present invention and which is designated in its entirety by the numeral 9.

The template member 9, which may be of any preferred material, is flat and substantially rectangular. The template member is provided adjacent the opposite ends thereof with spaced slots 10 and 11 which divide the same into a pattern section 12 of the desired shape and size of sheet to be cut and the end members 13 and 14 which preferably project slightly beyond the pattern section. As here shown, the slots 10 and 11 are open at their forward ends and are straight and parallel with one another, while the front edge 15 of the pattern section is curved outwardly. However, the pattern section may take any desired shape and the slots 10 and 11 need not be parallel with one another, nor need the front edge 15 be curved, depending upon the shape of sheet to be cut. The inner edges of the slots 10 and 11 define the end edges of the pattern section 12.

The cutting or scoring of the glass sheet is adapted to be accomplished by the use of a scoring tool of the hand operated type such as is illustrated in Fig. 3. As shown, this cutting tool comprises a substantially rectangular body portion 16 carrying at its upper end a handle 17 and at its lower end the scoring or cutting element 18 which may be either in the form of a diamond or a rotatable steel wheel. In practice, the body portion 16 of the scoring tool is adapted to be of such a size as to snugly fit within the slots 10 and 11 so that when the tool is positioned within the said slots, it will be maintained in a vertical position and will be prevented from inclining either to one side or the other.

When it is desired to cut a glass sheet or plate, the template member 9 is first swung upwardly to its broken line position indicated in Fig. 2 so as to permit a glass sheet 19 to be laid upon the table top 5 and this sheet is positioned so that the rear longitudinal edge thereof will abut the forward edge of strip 7, the sheet projecting at its ends beyond slots 10 and 11 and also forwardly of the curved edge 15. The template is then lowered onto the glass and, in order to hold the said template steady during cutting, the end portions 13 and 14 thereof are provided adjacent their forward ends with apertures which receive therein stationary pins 20 carried by the top of the table.

When the glass and template have been positioned in the manner above described, an operator takes the cutting tool illustrated in Fig. 3 and inserts it within the slot 10 or 11 at the rear end thereof. The operator then draws the cutting tool forwardly over and in engagement with the glass to score the same. After one end cut has been made, the opposite end is cut or scored in the same manner. The forward cut is then made by drawing the cutting tool over the glass while holding it in engagement with the forward edge 15. The template is then raised, the glass removed, and broken along the score lines. As pointed out above, the scoring tool is adapted to be of such a size as to fit snugly within the slots 10 and 11 so that it will be maintained in a vertical position and prevented from inclining either to one side or the other during the scoring of the glass. Thus, the cutting tool will be positively maintained in a straight vertical position so that the sheet cut will be of the desired size.

In the cutting of glass for automobile windshields, windows, and the like, it is particularly essential that the width of the sheet come within very close limits, due to the sliding of the glass within the holding frames. For instance, a door or window light may be a little oversize as regards height without being objectionable, yet the same oversize in width would necessitate a grinding of the sheet to remove the excess material. Likewise, if the sheet is a little undersize as regards height, it may not be objectionable, while the same undersize in width might result in the rejection of the sheet. However, by providing a template member of the character above described, a close accurate cut, particularly as regards the width of the sheet, is assured. Moreover, the obtaining of this close accurate cut is not dependent wholly upon the skill of the operator in maintaining the cutter straight since the cutter is positively maintained in a straight vertical position by the template member.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the cutting of glass sheets or plates, a template member adapted to rest upon the sheet to be cut, said template member having a pattern section of the shape and size of sheet to be cut and being further provided with slots, the inner edges of which define the outer edges of said pattern section, said slots being provided for the reception of a scoring tool which is adapted to fit snugly therein.

2. In apparatus for use in the cutting of glass sheets or plates, a template member adapted to rest upon the sheet to be cut, said template member being provided with spaced slots dividing the same into a central pattern section of the shape and size of sheet to be cut and end portions disposed outwardly of the pattern section, said slots being open at their forward ends and being provided for the reception of a scoring tool which is adapted to fit snugly therein.

CONRAD B. SCHAFER.